United States Patent
Rhee

(10) Patent No.: US 7,149,777 B1
(45) Date of Patent: Dec. 12, 2006

(54) METHOD FOR ADMINISTERING MESSAGE ATTACHMENTS

(75) Inventor: David R. Rhee, Metuchen, NJ (US)

(73) Assignee: Avaya Technology Corp., Basking Ridge, NJ (US)

( * ) Notice: Subject to any disclaimer, the term of this patent is extended or adjusted under 35 U.S.C. 154(b) by 730 days.

(21) Appl. No.: 09/765,848

(22) Filed: Jan. 19, 2001

Related U.S. Application Data

(60) Provisional application No. 60/177,163, filed on Jan. 20, 2000.

(51) Int. Cl.
*G06F 13/00* (2006.01)

(52) U.S. Cl. .................. 709/206; 709/225; 719/328

(58) Field of Classification Search ........ 709/201–203, 709/206–207, 217–219, 230–231, 245; 379/88.11, 379/88.12, 88.13, 88.14, 88.15, 88.22–88.25; 719/328, 329
See application file for complete search history.

(56) References Cited

U.S. PATENT DOCUMENTS

| | | | | |
|---|---|---|---|---|
| 5,434,910 A | * | 7/1995 | Johnson et al. | 379/88.15 |
| 5,841,966 A | * | 11/1998 | Irribarren | 709/206 |
| 5,951,638 A | * | 9/1999 | Hoss et al. | 709/206 |
| 6,219,694 B1 | * | 4/2001 | Lazaridis et al. | 709/206 |
| 6,304,573 B1 | * | 10/2001 | Hicks, III | 370/401 |
| 6,459,774 B1 | * | 10/2002 | Ball et al. | 379/67.1 |
| 6,490,614 B1 | * | 12/2002 | Shaffer et al. | 709/206 |
| 6,526,128 B1 | * | 2/2003 | Kermani | 379/88.22 |
| 6,563,912 B1 | * | 5/2003 | Dorfman et al. | 379/88.13 |
| 6,591,367 B1 | * | 7/2003 | Kobata et al. | 713/201 |
| 6,628,306 B1 | * | 9/2003 | Marchionda | 715/752 |
| 6,839,411 B1 | * | 1/2005 | Saltanov et al. | 379/88.13 |

* cited by examiner

*Primary Examiner*—Viet D. Vu

(57) ABSTRACT

A method for more effectively accessing message attachments that is particularly applicable in a telephone voicemail or e-mail system. The system provides users with the ability to selectively process attachments to a main or originating message and to designate messages as able to be forwarded only once and/or be reviewed only once. Among other benefits, the time required for handling attachments and/or for listening to attachments is reduced. Various embodiments of the invention include the use of telephone keypad input control, push-button, voice recognition and computer control.

27 Claims, 4 Drawing Sheets

Fig. 6

| Double click to select: | | | |
|---|---|---|---|
| Message 1 | .29 M 743-6794 | Playing | |
| Attachment 1 | .15 M | 743-9406 | Playing |
| Attachment 2 | 1.06 M | 743-9364 | Skip |
| Attachment 3 | .56 M | 743-2754 | Skip |
| Attachment 4 | 1.00 M | 743-4659 | Skip |
| Message 2 | 2.0 M | XXXXX | Play |
| Message 3 | .15 M | 743-7494 | Play |
| Message 4 | .45 M | 743-8734 | Play |
| Attachment 1 | .15 M | 743-9406 | Play |
| Attachment 2 | 1.06 M | 743-3364 | Skip |
| Attachment 3 | 1.06 M | 743-7344 | Skip |
| Attachment 4 | .25 M | 743-8493 | Skip |
| Attachment 5 | .15 M | XXXXX | Skip |
| Attachment 6 | 1.50 M | 743-9883 | Skip |
| Message 5 | .45 M | 743-6794 | Play |
| Attachment 1 | .15 M | 743-9406 | Skip |
| Attachment 2 | 1.06 M | 743-9364 | Skip |
| Message 6 | .50 M | 743-6794 | Play |

METHOD FOR ADMINISTERING MESSAGE ATTACHMENTS

CROSS-REFERENCE TO RELATED APPLICATIONS

This application claims the benefit of the provisional application, Ser. No. 60/177,163, filed on Jan. 20, 2000, entitled "A METHOD FOR ADMINISTERING MESSAGE ATTACHMENTS."

BACKGROUND OF THE INVENTION

1. Field of the Invention

The invention is related to systems for processing messages and message attachments such as telephone, e-mail, and other systems.

2. Discussion of the Related Art

In modern times, communications and data processing tools continue to be enhanced and developed at an ever-increasing rate. The challenge of the day has become that of dealing with the information explosion that touches almost every aspect of people's lives. Many systems have been developed that help to automate the delivery of communicated information. Systems that focus on fine-tuning the delivery and handling of such information improve upon its value and effectiveness to users.

Many of the voice message systems that exist today have a feature that provides the ability to forward voice messages from one recipient to one or more additional recipients. In addition, many of those systems frequently include a feature that allows a user to record a further message as an attachment to the initial message, which is forwarded along with the initial message. Typically, the attachment contains a further explanation or comment regarding the initial message. As each attachment is added to the initial voice message, successive recipients are forced to listen to a string of attachments before being able to hear the initial message.

In some cases attachments do not add any additional information. They may provide nothing more than a historical track record of the earlier recipients who forwarded the initial message or other non-essential information, such as might be provided by secretaries or other support personnel. However, in this and other situations, the ultimate recipient is forced to listen to all of the attachments before listening to the initial message. The process of reviewing attachments is inefficient and, at times, can consume more user time than that required for listening to the initial message itself.

SUMMARY OF THE INVENTION

The present invention is a method that simplifies the handling of telephone system voicemail, e-mail and other communicated messages thereby increasing effectiveness and reducing consumption of user time. Telephone voicemail systems that exist today routinely provide the ability to record voice messages from a caller; many also provide recipients with the ability to forward voicemail messages to other recipients with attached comments. When the initial message and attachments reach their destination, the recipient must listen to all of the attached comments in order to hear the initial message. In such voicemail systems, messages may be sent over and over again with the possibility of having a string of numerous comments attached.

The invention provides a user with the option to separate attachments and the initial message so that he or she can listen to any, all, or a combination of attachments, partial attachments, and the initial message. A user can also elect to selectively delete forwarding messages and/or attachments before forwarding to a further recipient. Another feature of the invention provides users with additional security for initial messages and attachments by providing users with the ability to limit the transferability of initial messages and attachments.

The invention may be configured with any of a variety of different input/output control mechanisms including a telephone keypad, with or without voice prompting, dedicated pushbuttons associated with an access terminal, possibly including liquid crystal or other displays, voice recognition, and/or a computer interface.

In addition to the advantage of saving user time, the invention also provides a saving of system storage space.

BRIEF DESCRIPTION OF THE DRAWINGS

FIG. 6 shows a typical computer display of message and attachment information for an embodiment of the invention using a computer for input/output.

DESCRIPTION OF THE PREFERRED EMBODIMENT

Figure 1:
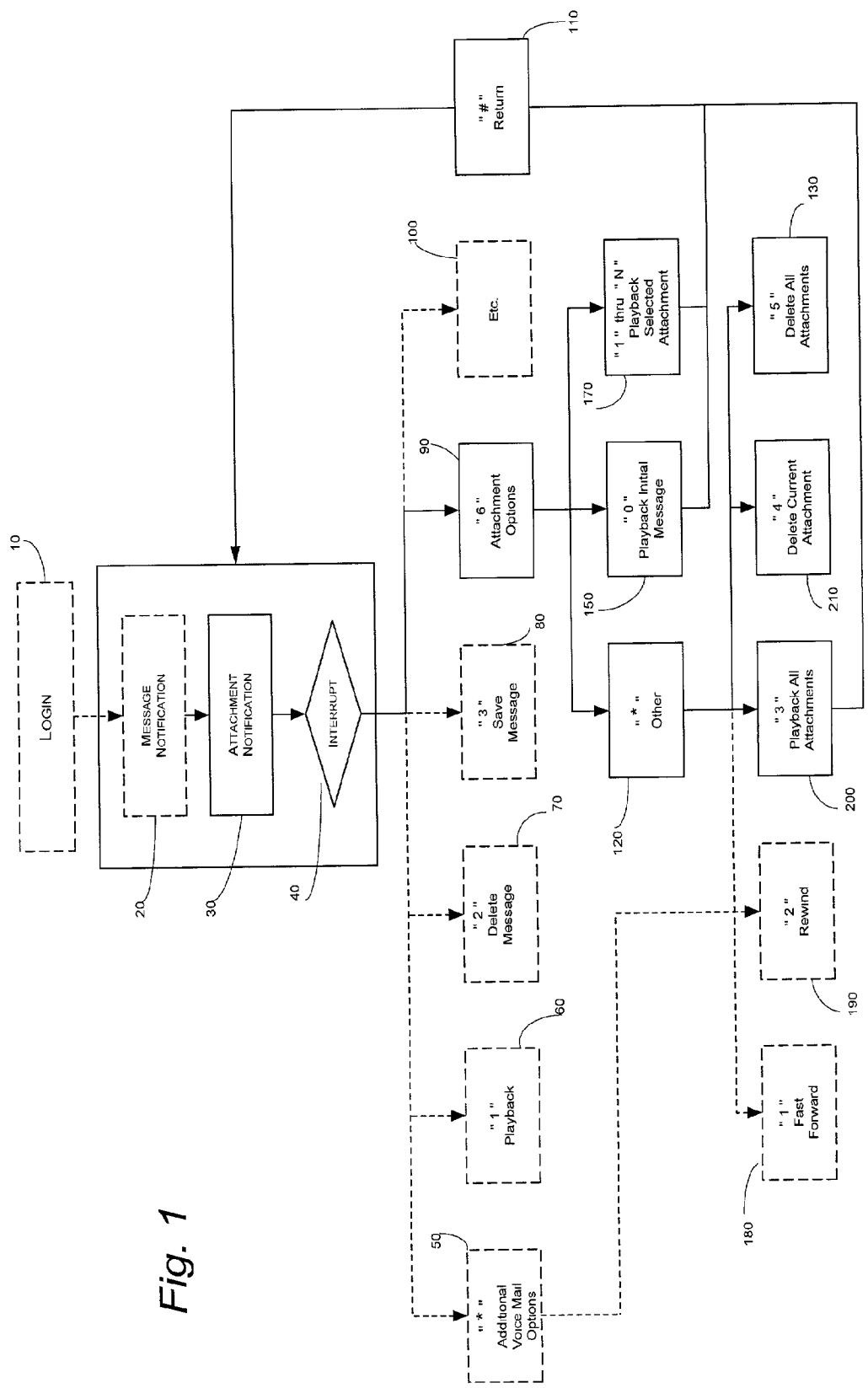
FIG. 1 depicts the operational steps of the invention as used in conjunction with a voice messaging system.

The methodology of the invention may be applied for voice message systems based upon any of a wide variety of designs, user commands and/or options. An exemplary application of the methodology of the invention in a voice messaging system is schematically illustrated in FIG. 1. Although the system depicted in the figure includes conventional, high-level voice messaging functions, as indicated by the dashed lines, the focus of the presentation is on the application of the methodology of the invention with such a voice-messaging system. To that end, the functions directed particularly to the implementation of that methodology are shown by the solid lines in the figure. Accordingly, it should be understood that, as to the conventional voice messaging system, the figure is not intended to provide a complete functional illustration of such a system, but rather to provide a high-level representation of that system as context for the application of the methodology of the invention.

Considering now the system and associated methodology depicted in FIG. 1, the initial interface to the voice messaging system for a user will normally be via an execution by the user of a LOGIN procedure 10, which will typically occur by means of a command executed at a user terminal (which may also include user-identification information and/or a password)—thereby alerting the system of the user's desire to process voicemail. The user may have been notified of having received voicemail by means of a visual display such as a digital display or indicator light. Upon logging into the voicemail system, the user is advised (Message Notification 20) as to the number of messages held in the user mailbox. Such message notification is typically provided by means of an automated system voice prompt informing the user of the availability of received voicemail, and the number of messages received. After notification of the existence of voicemail, and the number of messages stored, the user typically can elect to listen to stored voicemail messages by selecting the appropriate command option. The typical voice message system provides several voice menu prompts, which may occur contemporaneously with, or following the initial playing of a stored message. Exemplary such prompts are: "Press '1' to play/replay message, '2' to delete, '3' to save, . . . , '6' for other options," etc.

Upon receipt of such a system-generated voice prompt, a user may generally indicate a choice of command options by pressing a key on the telephone keypad. Alternatively, pushbutton keys at a user terminal which are dedicated to voicemail commands may be provided. Other means for such user interface with the voice-mail command menu, including use of voice recognition techniques applied to spoken commands, will be apparent to those skilled in the art.

Some voicemail systems provide the ability to forward messages to another party. Many such systems also provide a user with the option to forward messages to another party or parties with a comment attached. Such comments are more generally referred to as attachments. At the destination (s) of the forwarded message (including attachment(s)), a recipient may playback the original message and attachment (s) added by the forwarding party(ies) together as a combined unit. Usually, playback of any message begins with the associated attachments, in order of the last recorded attachment played first, ultimately followed by the initial message.

In a voice-mail system implemented according to the method of the invention, a user is provided a set of attachment options by which various actions with respect to message attachments may be selected. As previously indicated, for the voice-messaging system shown in FIG. 1 conventional features are shown by dashed lines and the attachment-option features provided according to the invention are shown by solid lines. Accordingly, a user may, by selection of the appropriate keypad number, choose to process either conventional voice-mail system actions 50, 60, 70, 80 & 100 or attachment related actions 90, 120, 150 & 170 (and subsets thereof) in accordance with the methodology of the invention. [Note that numerals and other keypad symbols shown within functional blocks of the figure are intended to represent exemplary keypad choices for invoking the designated function. To avoid possible confusion with the reference numbers shown in the figure outside each functional block, those functions will be described herein only with respect to such reference numbers.] It will, of course, be appreciated that the voice-messaging system depicted in FIG. 1 is merely exemplary of such systems, and that the methodology of the invention is applicable to any voice-messaging system in which attachments may be added to an initially-received message.

In the operation of the invention, the system will provide information as to the number of messages being held for the user in response to a user's initial query of the system (as in conventional voice-mail systems). Upon selection by the user of a given message for playback, the system provides a further report as to whether the selected message also includes attachments (Attachment Notification 30) and the number of such attachments associated with the message. For example, the Attachment Notification function may cause the system to announce: "This is an N times forwarded message", where N represents the number of times that attachments have been appended to the initial message.

For a preferred embodiment of the invention, the user can interrupt this, or any other system prompt at any point by pressing a telephone keypad key to execute a system command—e.g., commands designated 60, 70, 80 or 90 in FIG. 1. As a corollary, in the absence of a user interrupt, system functions will be engaged according to a default sequence. For example, if no user interrupt 40 is received following the Attachment Notification, an exemplary default sequence would cause the voice-messaging system to playback message attachments in order of the most recent first, followed by the original message.

While the user might accept the default sequence, it is assumed, for purposes of describing the invention, that the user wishes to manage the attachments for the selected message, according to the methodology of the invention, and will therefore select the Attachment Option command 90. Upon making that selection, the user will be prompted with the attachment selection options and, as before, may interrupt the options prompt at any time to select an option.

Options available to the user at that point include selection of Initial Message Playback 150 (which may, in an exemplary configuration, be selected by pressing the numeral "0") or selection of Attachment Playback 170 for playback of a selected one of the indicated attachments to the selected message. In an exemplary configuration, the selection of the Attachment Playback option, as well as of the specific attachment selected for playback, may be indicated by a keypad entry of a numeral between 1 and N (corresponding to the N available attachments). The Attachment Playback command 170 may be repeatedly selected by the user to listen to various of the N attachments as chosen by the user, as indicated by the appropriate keypad entry.

Supplementary to the Message Playback 150 and Attachment Playback 170 options, additional attachment-related options are provided, preferably as a submenu from the Other command 120 (in order to conserve a limited selection of keypad numerals/symbols). For an exemplary configuration, the Other command may be selected by use of the asterisk (*) symbol. Among the supplementary attachment-related options available in the Other submenu are Playback All Attachments 200 (illustratively selected by a keypad numeral "3"), Delete Current Attachment 210 (illustratively selected by a keypad numeral "4") and Delete All Attachments 130 (illustratively selected by a keypad numeral "5"). It is noted that generic message handling options, such as Fast Forward 180 and Rewind 190, are applicable to either the Attachment Playback functions or to general message-processing functions, and are therefore shown in the figure in dashed outline. Other attachment-related options will be apparent to those skilled in the art and are intended to be encompassed within the scope of the invention.

To address the instance of a user wishing to end attachment processing activity in respect to a given message—e.g., to select a different message for review of the message and/or attachment content, the invention provides a Return option 110 (illustratively selected by keypad symbol "#"). Upon selection of the Return option, which may be selected during a system prompt or during playback of a message or attachment, attachment processing is halted and the user is returned to the Message/Attachment Notification functions 20/30 for processing of the next stored voice message and/or attachments. This process can be repeated until the user either completes message and attachment processing or elects to leave the voicemail system.

It should be apparent that, although the choice of keypad number assignments presented in FIG. 1 is a useful scheme which is consistent with some prior art voicemail systems, the number/keypad assignments are merely representative of a variety of available schemes. Other embodiments of the invention are envisioned using alternative numbering schemes that nevertheless incorporate the novel elements described by the invention.

The invention may use any of a variety of input control mechanisms of which the most common is the telephone keypad. Another exemplary input control arrangement would include the use of pushbuttons that are dedicated to message handling. A variation of using dedicated pushbuttons controls involves the use of pushbuttons in conjunction with liquid crystal or another type of display whereby the function performed by the pushbuttons may change according to which options had been selected earlier. By using such an arrangement, fewer pushbuttons would be required for the message control functions needed.

Yet another input control mechanism involves the use of voice recognition. A voice-recognition based system would permit the user to speak voice attachment and message control options. For example, after receipt by the user of a notification as to the number of attachments in a similar manner as provided in the telephone keypad input control system, the user would speak such commands as "play all", "attachment 2", or "attachment 2,5, and 7", or "play initial message", etc.

Finally, an additional input control mechanism would use a personal computer or other such terminal device. With such a system, the user may, for example, be provided with a video display of the voice message items available for review, listing all of the initial messages and attachments. This system may also provide user prompts requiring input from the user as to which attachments are to be played. If a computer or other intelligent terminal is used for display and user input control, the computer may also be arranged to display other useful related information. The computer may, for example, be programmed to retrieve from a data base the names and/or extension/phone numbers of the persons who have added their attachments to a given message and to display that information for the user.

An illustrative example of a user-interface display for such a computer-enhanced input arrangement is shown in FIG. 6. In that figure, the display contains a line that represents each voicemail message and related attachment. Each voicemail message and/or attachment may be selected by double-clicking on the line(s) for the message desired, or using the shift key-drag approach commonly used by various computer systems, or by entering the desired selection by keyboard. It should be understood, however, that the display of FIG. 6 is merely illustrative, as the versatility of the modern computer/intelligent-terminal permits a wide variety of alternate arrangements of such a computerized user interface. Those skilled in the art will readily discern numerous such variations, and all such variations are intended to be within the scope of the invention.

Figure 2:
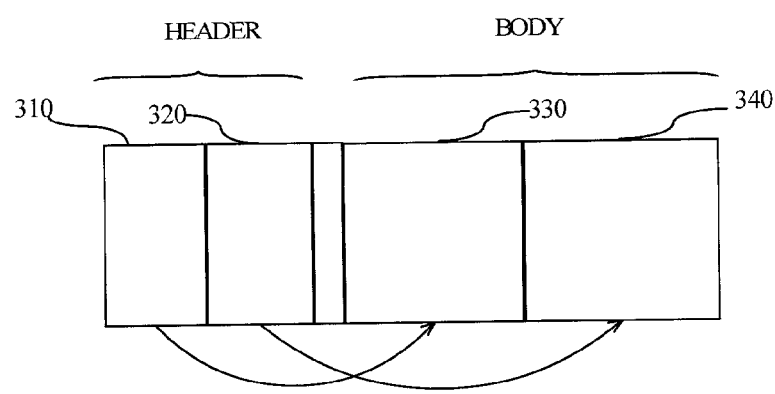
FIG. 2 shows a diagram of the internal architecture of a stored initial message and one attachment.
Figure 3:
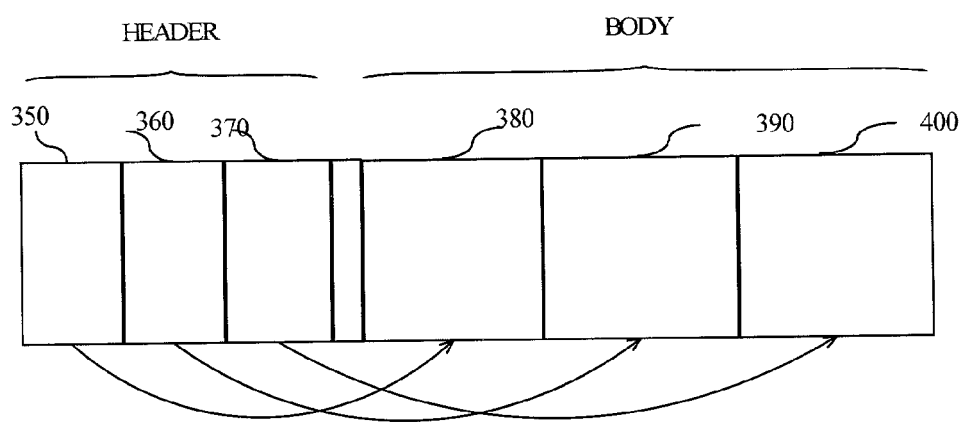
FIG. 3 shows a diagram of the internal architecture of a stored initial message and two attachments.

Management of stored attachment messages according to the method of the invention includes a storage arrangement for messages and attachments that permits convenient access and efficient use of storage media. As schematically illustrated in FIG. 2, for a message with one attachment, messages and their attachments are stored in the form of header and body records. As will be seen in the figure, the header section 310 includes a pointer to the initial message, 330 and the header section 320 includes a pointer to the message attachment, 340. All header blocks are the same size and are set up to store the same information. Typically, header blocks will contain the address or other location information of the corresponding initial message or message attachment itself. The headers may be searched using a sequential, random or other available method. The headers may also contain information about the length of the message or attachment, source or other message-related information (e.g., read-one-time and non-forwardable message status information, as described below). [Note: Although the header/body analog is useful to characterize the relationship between the address/status information of the header and the message content of the body, it should be understood that the header and body for a given message/attachment do not necessarily constitute a contiguous data record, and that the data record representing the message content (body) will, in at least some instances, be stored at a different memory address than its corresponding header information.] Messages/attachments in the body section may vary in size depending upon the content of the stored message or attachment. They may not necessarily be contiguous and may be deleted as a result of user action, or reorganized by the system to effect efficient use of storage space. In FIG. 3, a schematic depiction of a message with two attachments is shown organized according to the header/body storage approach of the invention. In the figure, the three headers, 350, 360 and 370 correspond respectively to message body record 380 and attachment body records 390 and 400, and include respective pointers to each of those records.

It can thus be seen that the method of the invention permits the system to effectively find stored messages and attachments, yet accommodate the considerations necessary for efficient storage, particularly the irregularity of message and attachment sizes and the potential for wasted storage space in the event that some attachments are erased.

An additional feature of the invention permits users to limit the life of messages and message attachments, thereby saving storage space and, potentially, user time. Accordingly, a user who records a voicemail message may designate the message as being not forwardable. In the alternative, the user may designate a voicemail message as being limited to a single re-play. Both of these features also provide an added security benefit for messages carrying sensitive information.

Figure 4:
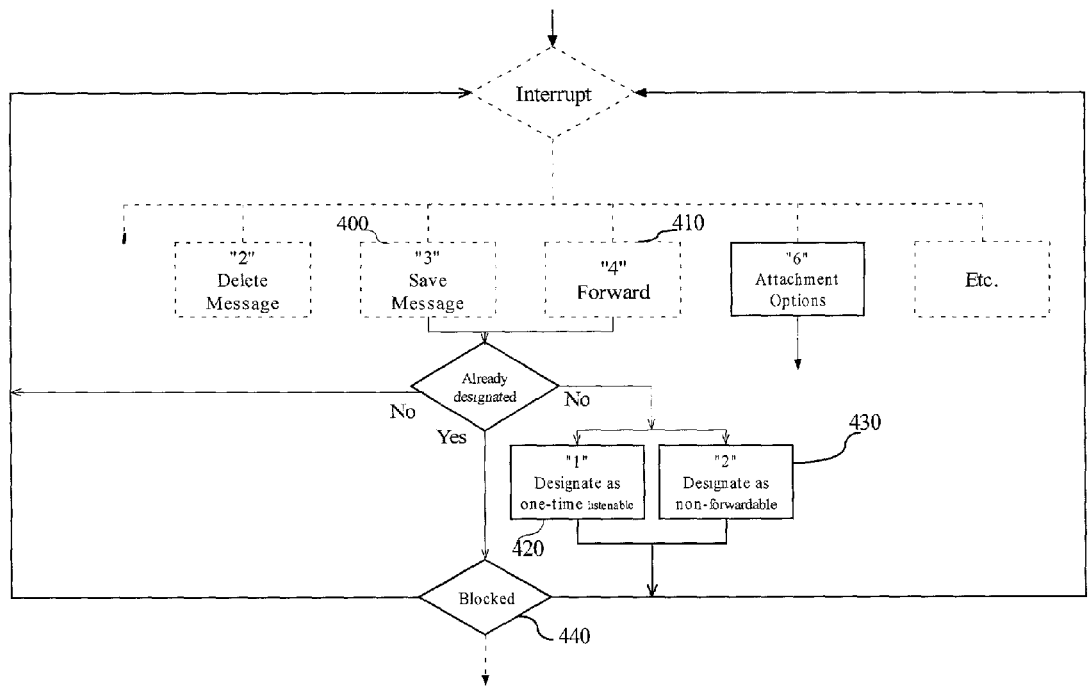
FIG. 4 shows a flow diagram of the operational steps of the non-forwardable and one-time-listenable message designation features of the invention as used for re-forwarded messages.

FIG. 4 demonstrates the application of both features in the case of an exemplary message that is being re-forwarded to an additional party. Having begun to listen to messages, the user may elect to save a forwarded message for future review using a "save" feature 400 of the voice message system. However, if the message had been designated as one-time-listenable by a prior user, the invention will block the save operation and provide an appropriate user prompt 440, advising that the option is blocked for that message. If, on the other hand, the message had not previously been designated as one-time-listenable, it will be saved.

The user may likewise elect to forward a message to another user using the "forward" function 410. If the message had been designated as either one-time-listenable or non-forwardable, the invention will block the forwarding operation, 440, and provide the user a prompt advising that the option is blocked for that message. If the message is not precluded from being forwarded, the system may be arranged to prompt whether the user would like to designate the message as one-time-listenable 420 or non-forwardable with regard to downstream users 430, and then perform the forward operation.

Figure 5:
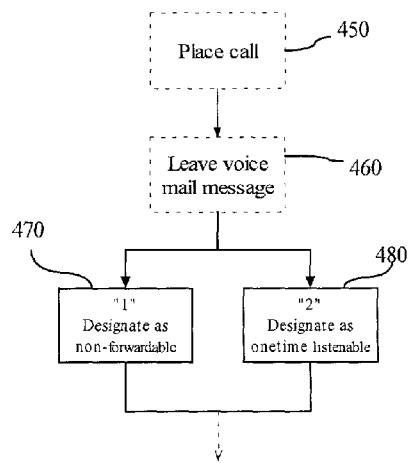
FIG. 5 shows a flow diagram of the operational steps of the non-forwardable and one-time-listenable message designation features of the invention as used for initial messages.

FIG. 5 is a flow diagram showing the method for designating messages as non-forwardable or one-time-listenable at the time of initially recording the voice message. The user places a call 450 and leaves a voice message 460 as is typical in prior art voicemail systems. Once the message has been recorded, the user is prompted and offered the option to designate the message as non-forwardable 470 or one-time-listenable 480, as described previously.

Finally, it can easily be seen that the method of the invention as it is described herein, for handling voice messages and attachments within a telephone communications system, has clear analogs in other communications systems, particularly e-mail systems. Just as telephone voicemail systems have originating messages with appended attachments, e-mail systems also typically have originating messages to which have been either appended or pre-pended any number of additional comments and/or messages. In the same manner as described earlier with regard to voicemail attachments, e-mail attachments may be of much less communicative value than the originating message or could indeed be totally superfluous. It is envisioned that an alternative embodiment of the current invention provides users with the necessary computer-prompted option to input, and/or select, any, all, or a combination of attachments for review, possible deletion or forwarding in the same manner as described herein for voicemail messages. Likewise, e-mail messages may be designated as one-time-listenable or non-forwardable.

While details of the invention are discussed herein with reference to particular examples to which the principles of the present invention can be applied, the applicability of the invention to other devices and equivalent components thereof will become readily apparent to those of skill in the art.

Accordingly, it is intended that all such alternatives, modifications, permutations, and variations to the exemplary embodiments can be made without departing from the scope and spirit of the present invention.

I claim:

1. In a messaging system providing access for authorized users to pre-stored messages, wherein at least one of said pre-stored messages has multiple message portions including an initial audio message created by a first person and one or more audio attachments to said initial audio message created by a person or persons other than the first person, a method for providing access to selected portions of said at least one of said pre-stored messages comprising the steps of:
   providing a signal to a user indicative of at least one of said pre-stored messages being available for access by said user;
   upon selection by said user of an available pre-stored message, having multiple message portions including an initial audio message created by a first person and one or more audio attachments to said initial audio message created by a person or persons other than the first person, providing said user a different signal indicating that said selected pre-stored message includes both an initial audio message and one or more audio attachments;
   providing a user option for selecting one message portion from a selected pre-stored message which includes an initial audio message with one or more audio attachments; and
   upon selection by a user of said one message portion of said selected pre-stored message, causing only said selected portion to be provided to said user,
   wherein said pre-stored messages may be coded to restrict a forwarding of one or more portions of a message so coded to one or more identified users.

2. The method for providing access of claim 1 wherein said user option for selection of said one message portion includes an initial selection choice between said initial audio message and said audio attachments.

3. The method for providing access of claim 2 wherein an exercise of said initial selection choice in favor of said audio attachments provides a further option to select a given one of said audio attachments associated with said selected pre-stored message.

4. The method for providing access of claim 3 wherein said selection of said given one of said audio attachments is iteratively repeated to select additional ones of said audio attachments associated with said selected pre-stored message.

5. The method for providing access of claim 1 wherein at least one of said user selection steps is initiated by said user in response to a prompt generated by said messaging system.

6. The method for providing access of claim 5 wherein said user response includes an interrupt signal to said system prompt.

7. The method for providing access of claim 5 wherein said user response is manifested by engaging a pre-designated key on a keypad associated with said messaging system.

8. The method for providing access of claim 5 wherein selectable portions of said pre-stored messages are stored in a memory associated with a computer processor, and said user response is manifested by selection of said desired message portion via a graphical user interface associated with said computer processor.

9. The method for providing access of claim 1 wherein said messaging system is a voice mail system.

10. The method for providing access of claim 9 wherein said provision of said selected portion to said user is implemented via an audio playback of said selected portion.

11. The method for providing access of claim 1 further including a user option to return to a start position upon initiation by said user of a pre-designated interrupt signal.

12. The method for providing access of claim 1 wherein said pre-stored messages are formatted in the form of header and body sections, and wherein said header section includes address, location and status information and said body section includes message content.

13. The method for providing access of claim 12 wherein, for a pre-stored message including audio attachments, said header section for an attachment includes a pointer to its associated initial audio message.

14. The method for providing access of claim 1 wherein said pre-stored messages may be coded to restrict selection of one or more portions of a message so coded to a predetermined number of user-selection operations.

15. A messaging system for providing authorized users of said system with access to selected portions of pre-stored messages, wherein at least one of said pre-stored messages has a plurality of message portions including an initial audio message created by a first person and one or more audio attachments to said initial audio message created by a person or persons other than the first person, said system comprising:
   a message available indicator operative to provide a signal to a user of at least one of said pre-stored messages being available for access by said user;

an input device responsive to user input to select an available message for further processing by said system;

a message attachments indicator operative to provide a signal to said user indicating that a selected available message, including an initial audio message created by a first person and one or more audio attachments to said initial audio message created by a person or persons other than the first person, includes both an initial audio message and one or more audio attachments;

a selection interface operating in conjunction with said input device for providing said user an option to select a desired portion of a message that includes one or more audio attachments, and for accepting a signal from said user identifying said selected desired portion;

an output device for providing said selected desired portion to said user; and a coding means operative to code said pre-stored messages to restrict a forwarding of one or more portions of a message to one or more identified users.

16. The messaging system of claim 15 wherein said selection interface is operative to provide said user an initial selection choice between said initial audio message and said audio attachments.

17. The messaging system of claim 16 wherein said selection interface provides a further option to select a given one of said audio attachments associated with said selected pre-stored message.

18. The messaging system of claim 17 wherein, upon selection by said user of said given one of said audio attachments, said selection interface further provides an option to repeatedly select additional ones of said attachments.

19. The messaging system of claim 15 wherein said input device includes a keypad.

20. The messaging system of claim 15 further including a computer processor, an associated memory and an associated graphical user interface, wherein selectable portions of said pre-stored messages are stored in said memory and said user selection of a desired message portion is manifested via said graphical user interface.

21. The messaging system of claim 15 wherein said system is configured for storing and processing voice mail.

22. The messaging system of claim 15 further including a coding means operative to code said pre-stored messages to restrict selection of one or more portions of a message to a predetermined number of user-selection operations.

23. The messaging system of claim 15 wherein said pre-stored messages are formatted in the form of header and body records, and wherein said header section includes address, location and status information and said body section includes message content.

24. In a messaging system providing access for authorized users to pre-stored messages, wherein at least one of said pre-stored messages has multiple message portions including an initial audio message created by a first person and one or more audio attachments to said initial audio message created by a person or persons other than the first person, a method for providing access to selected portions of said at least one of said pre-stored messages comprising the steps of:

providing a signal to a user indicative of at least one of said pre-stored messages being available for access by said user;

upon selection by said user of an available pre-stored message, having multiple message portions including an initial audio message created by a first person and one or more audio attachments to said initial audio message created by a person or persons other than the first person, providing said user a different signal indicating that said selected pre-stored message includes both an initial audio message and one or more audio attachments;

providing a user option for selecting one message portion from a selected pre-stored message which includes an initial audio message with one or more audio attachments; and upon selection by a user of said one message portion of said selected pre-stored message, causing only said selected portion to be provided to said user, wherein a pre-stored message, including an initial audio message created by a first person and one or more audio attachments to said initial audio message created by a person or persons other than the first person, is coded by the user and forwarded by the user to a further user, wherein the coding limits the ability of the further user to forward the initial audio message or one or more of the audio attachments.

25. The method for providing access of claim 1, wherein a pre-stored message, including an initial audio message created by a first person and one or more audio attachments to said initial audio message created by a person or persons other than the first person, is partially deleted by the user and forwarded by the user to a further user, wherein the deleted portions may include the initial audio message or one or more of the audio attachments.

26. A messaging system for providing authorized users of said system with access to selected portions of pre-stored messages, wherein at least one of said pre-stored messages has a plurality of message portions including an initial audio message created by a first person and one or more audio attachments to said initial audio message created by a person or persons other than the first person, said system comprising:

a message available indicator operative to provide a signal to a user of at least one of said pre-stored messages being available for access by said user;

an input device responsive to user input to select an available message for further processing by said system;

a message attachments indicator operative to provide a signal to said user indicating that a selected available message, including an initial audio message created by a first person and one or more audio attachments to said initial audio message created by a person or persons other than the first person, includes both an initial audio message and one or more audio attachments;

a selection interface operating in conjunction with said input device for providing said user an option to select a desired portion of a message that includes one or more audio attachments, and for accepting a signal from said user identifying said selected desired portion;

an output device for providing said selected desired portion to said user; and a coding means, wherein a pre-stored message, including an initial audio message created by a first person and one or more audio attachments to said initial audio message created by a person or persons other than the first person, is coded by the user using said coding means and forwarded by the user to a further user, wherein the coding limits the ability of the further user to forward the initial audio message or one or more of the audio attachments.

27. The messaging system of claim 15, wherein said selection interface operating in conjunction with said input device also provides the user an option to select a desired portion of a pre-stored message, including an initial audio message created by a first person and one or more audio attachments to said initial audio message created by a person or persons other than the first person, to delete before forwarding the pre-stored message to a further user, wherein the deleted portions may include the initial audio message or one or more of the audio attachments.

* * * * *